(12) United States Patent
Gravisse et al.

(10) Patent No.: US 6,256,427 B1
(45) Date of Patent: Jul. 3, 2001

(54) PROCESS FOR CREATING SEVERAL DATA CIRCUITS ON AN OPTICAL FIBER AND DEVICE FOR EMBODIMENT OF THE PROCESS

(75) Inventors: Philippe Gravisse; Marc Schiffmann; Frank Rosset, all of Paris (FR)

(73) Assignees: Labaratoire de Physique du Rayonnement et de la Lumiere - LPRL; Frank Rossett, both of (FR)

( * ) Notice: Subject to any disclaimer, the term of this patent is extended or adjusted under 35 U.S.C. 154(b) by 0 days.

(21) Appl. No.: 09/149,623

(22) Filed: Sep. 8, 1998

(30) Foreign Application Priority Data

Feb. 3, 1998 (FR) ..................................................... 98 01230

(51) Int. Cl.$^7$ ....................................................... G02B 6/26

(52) U.S. Cl. ................................. 385/15; 385/24; 385/31; 385/46

(58) Field of Search ..................................... 385/15, 24, 31, 385/46, 48, 51; 359/124, 127; 250/227.23, 227.24

(56) References Cited

U.S. PATENT DOCUMENTS

| | | | |
|---|---|---|---|
| 3,932,023 | * | 1/1976 | Humer ................................ 350/96 C |
| 4,182,544 | * | 1/1980 | McMahon .......................... 350/96.16 |
| 4,329,017 | * | 5/1982 | Kapany et al. .................... 350/96.15 |
| 4,739,501 | * | 4/1988 | Fussganger ................................ 370/3 |
| 4,934,784 | * | 6/1990 | Kapany et al. .................... 350/96.18 |
| 4,993,796 | * | 2/1991 | Kapany et al. .................... 350/96.15 |

* cited by examiner

Primary Examiner—Frank G. Font
Assistant Examiner—Michael P. Mooney
(74) Attorney, Agent, or Firm—Schnader Harrison Segal & Lewis LLP

(57) ABSTRACT

This invention relates to a process for setting up several data paths on a single optical transmission fiber, including a modulation step consisting, for each data path, of modulating a light source with a specific wave length by signals corresponding to said data path, a step transmitting the modulated light signals to a mixer and a step of chromatically separating the light signals transmitted by the optical fiber, characterized in that the signals are multiplexed by an integrating sphere coated on the inside with a reflecting surface and including a plane reflector oriented perpendicular to the axis of the transmission optical fiber.

17 Claims, 5 Drawing Sheets

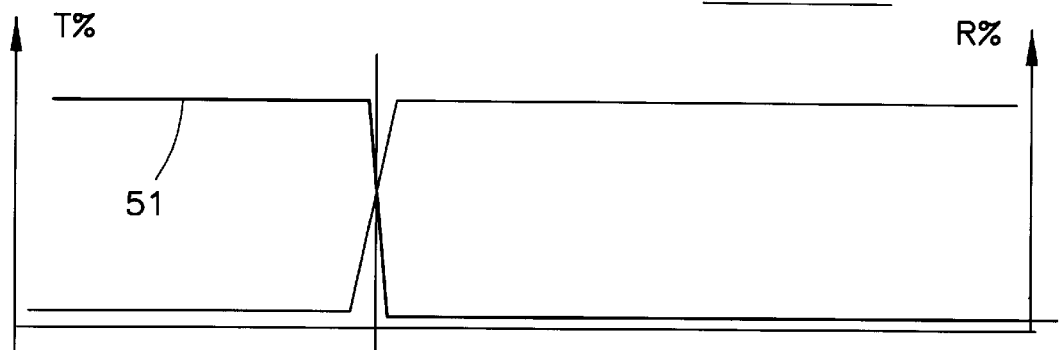
*Fig. 4*
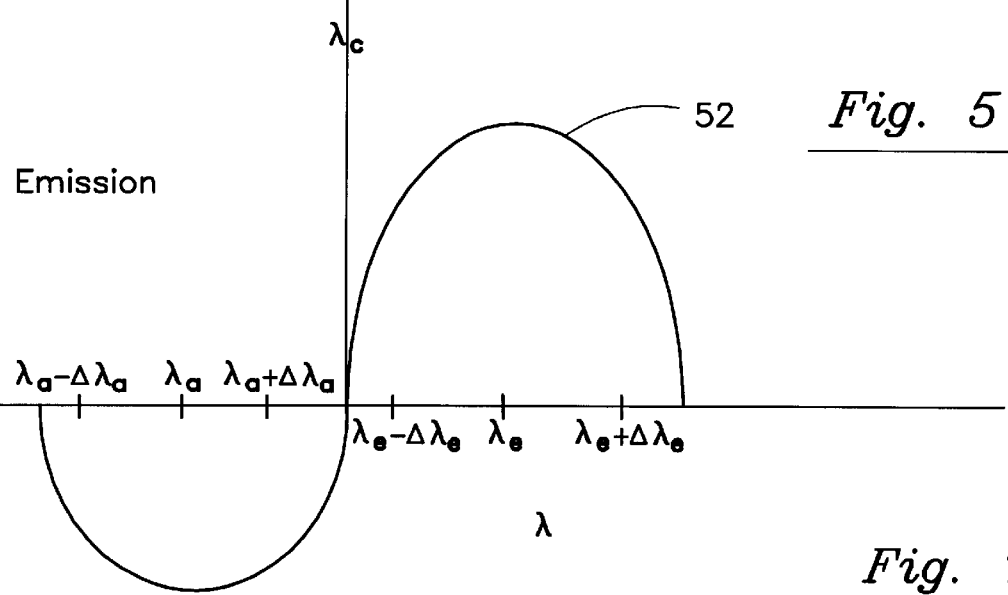
*Fig. 5*
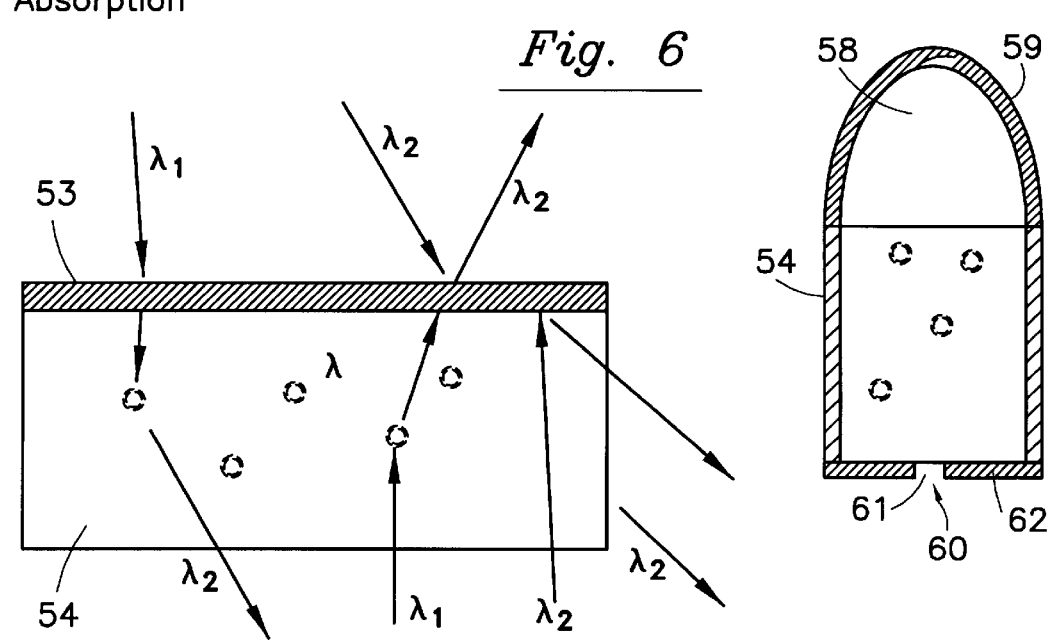
*Fig. 6*
*Fig. 7*

PROCESS FOR CREATING SEVERAL DATA CIRCUITS ON AN OPTICAL FIBER AND DEVICE FOR EMBODIMENT OF THE PROCESS

FIELD OF THE INVENTION

This invention relates to the data transmission domain, and more precisely the telecommunications using optical fibers.

BACKGROUND

Optical fibers are widely used for making telecommunication networks and for data transmissions in industrial environments, in aeronautics, and more generally in all applications requiring wide pass bands and insensitivity to electromagnetic radiation or parasites.

Optical fibers are made of special glass, usually doped with lead to improve transparency. The transmitted signal is detected by phototransistors. Electronic components are now the factors that limit the pass band. Their operating frequencies are very much lower than the pass bands of optical fibers. Consequently, electronic components limit the performances of a data transmission process using optical fibers.

To overcome this disadvantage, it has been proposed to make better use of the pass band of optical fibers by multiplexing several signals before transmission.

Wavelength Division Multiplexing (WDM) is a technique used in the prior art to take advantage of the pass band of single mode fibers. A multiplexer is a component that injects two (or more) signals with different wavelengths on the same line. Signals are separated at the other end of the line by a demultiplexer. Since these are reversible components, the same coupler can be used as a multiplexer or demultiplexer, although the isolation performance of the demultiplexer usually has to be better than that of the multiplexer. Typical units are designed for wave lengths of 1300/1550 nm which can double the capacity of existing lines, but the spectral response of a coupler can also be manipulated for other applications, for example, lasers and amplifiers with erbium doped fiber also require multiplexers.

These multiplexers in the prior art are not fully satisfactory, since the number of channels that can be mixed is limited and is fixed once and for all at the time of their manufacture. Furthermore, processes for making this type of multiplexer are expensive and depend on the nature of the light signals to be mixed.

The purpose of this invention is to suggest a process for optimizing the pass band of an optical fiber and reduce the cost of the optical components. Another important purpose of the invention is to add data circuits without the need to replace multiplexing means.

SUMMARY OF THE INVENTION

This invention relates to a process for setting up several data paths on a single optical transmission fiber including modulating a light source with a specific wave length by signals corresponding to the data path, transmitting the modulated light signals to a multiplexer, multiplexing the signals with an integrating sphere having its interior coated with a reflecting surface and having a plane reflector oriented perpendicular to the axis of the transmission optical fiber, and chromatically separating the light signal transmitted by the optical fiber.

This invention also relates to a device for setting up several data paths on a single optical transmission fiber including a plurality of input optical fibers, a transmission optical fiber, an integrating sphere with an internal reflecting surface connected between the input optical fibers and the transmission optical fiber, and a plane reflector oriented perpendicularly to the axis of the transmission optical fiber within the integrating sphere.

BRIEF DESCRIPTION OF THE DRAWINGS

The invention will be better understood in reading the following description with reference to the drawings, in which:

FIG. 4 shows a transmission and reflection response curve of the coating;

FIG. 5 shows a response curve of the doping agent;

FIG. 6 shows a diagram of operative principles of the device according to the invention;

FIG. 7 shows a sectional view of a device according to the parabolic embodiment.

DETAILED DESCRIPTION OF THE INVENTION

Figure 1:
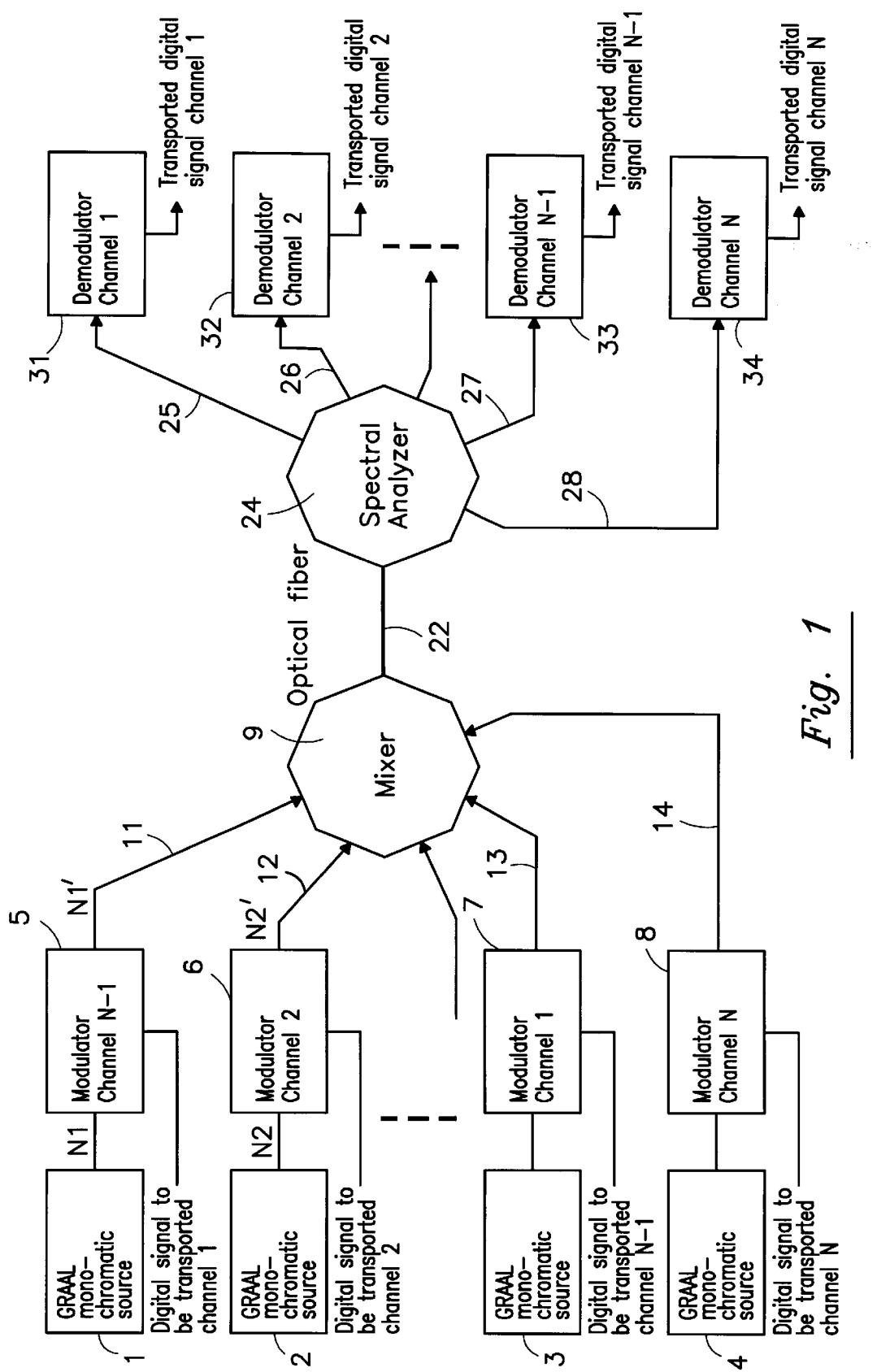
FIG. 1 shows a schematic view of equipment according to the invention.

Consequently, the invention concerns a process for setting up a large number of data paths on a single optical transmission fiber, comprising a modulation step consisting, for each data path, of modulating a light source with a specific wave length by signals corresponding to said data circuit, a step transmitting the modulated light signals to a mixer and a step of chromatically separating the light signals transmitted by the optical fiber, characterized in that the signals are multiplexed by an integrating sphere coated with a reflecting surface and comprising a plane reflector oriented perpendicular to the axis of the transmission optical fiber.

Beneficially, monochromatic light sources emit in wave lengths separated by at least 100 nm.

According to one preferred embodiment of the invention, the modulated signals are transmitted to the integrating sphere through optical connecting fibers radially coupled to a point on the integrating sphere without any reflecting coating.

According to one advantageous alternate embodiment, demultiplexing is done using a spectral analyzer. The spectral analyzer may be composed of a prism or a diffracting network coupled to photoreceivers.

According to another advantageous embodiment, the light signals are modulated by KERR electrooptical switches or by POCKEL electrooptical switches.

The invention also relates to a device for setting up several data circuits on a single optical transmission fiber comprising means of coupling several input optical fibers and a transmission optical fiber characterized in that it comprises a forked optical fiber or an integrating sphere coated with a reflecting surface and comprising a plane reflector oriented to be perpendicular to the axis of the transmission optical fiber.

Preferably, the reflecting coating is made of MgO.

According to one preferred embodiment, the invention relates to the embodiment of a modulated light source with a practically transparent matrix and, over part of the outside surfaces of said matrix, a coating with a high reflection factor in a first wave length band and a high transmission factor in a second wave length band. The doped matrix comprises at least one optically active doping agent absorbing electromagnetic energy in one or several wave length bands and reemitting energy in one or several wave lengths, at least one of the device wave lengths being reemitted at a wave length not equal to the excitation wave length, said matrix also comprising a filter coating with maximum transmission in one or several absorption wave length bands of the doped matrix, and with maximum reflection in at least one of the reemission wave length bands of the doped matrix. Advantageously, the invention relates to an optical device with a practically transparent matrix and, on part of the external surfaces of said external matrix, a coating with a high reflection factor in a first wave length band and a high transmission factor in a second wave length band, characterized in that the transparent matrix comprises optically active doping agents absorbing light energy in one wave length band $\lambda_a \pm \Delta\lambda_a$ and reemitting in wave length band $\lambda_e \pm \Delta\lambda_e$, the excitation band $\lambda_a \pm \Delta\lambda_a$ being included within the coating transmission range and the reemission band $\lambda_e \pm \Delta\lambda_e$ being included within the reflection range of said coating. The optically active doping agents are included in the matrix or are deposited on part of the external surfaces opposite the input surface of the incident beam of a transparent matrix.

When the incident beam comprises two rays $\lambda_a$ and $\lambda_e$, the output beam from the device according to the invention only has one ray $\lambda_e$, when the incident beam meets the face on which said coating is deposited.

However, the device allows neither of the two rays to pass when the incident beam meets the face opposite the treated beam.

According to a first variant, the doped matrix is coated with a pass band filter for which the cutoff wave length is between $\lambda_a$ and $\lambda_e$. According to a second variant, the doped matrix is coated with a pass band filter consisting of a dichroic filter. According to another variant, the doped matrix is coated with a pass band filter composed of an interference filter. According to one particular embodiment, the doped matrix also has part of its external surfaces coated with a reflecting material in the reemission wave length band and in the excitation wave length band of the doping agents, and a transparent area.

Advantageously, the shape of the doped matrix is a parallelepiped, the coating with a high reflection factor in a first wave length band and a high transmission factor in a second wave length band being provided on the entry surface of said device.

According to one variant, the shape of the doped matrix is a parabola, the coating with a high reflection ratio in a second wave length band being provided on the side surfaces.

According to one variant, the optically active doping agents are deposited on the surface of the transparent matrix.

The invention also concerns a device consisting of a large number of cells each formed by a matrix with a dichroic filter on its entry surface, the cell with index n has a matrix doped with doping agents absorbing light energy in a wave length band $\lambda_{an} \pm \Delta\lambda_{an}$ which corresponds to $\lambda_e(n-1) \pm \Delta\lambda_e$ (n−1)

and retransmitting in a wave length band $\lambda_{en} \pm \Delta\lambda_{en}$, the excitation band $\lambda_{an} \pm \Delta\lambda_{an}$ being included within the transmission range of the dichroic coating and the retransmission range $\lambda_{en} \pm \Delta\lambda_{en}$ being included in the reflection range of said coating. This embodiment can discriminate incident wave lengths and is particularly useful for discriminating different types of laser illumination beams in order to identify the type of danger.

Referring now to FIG. 1, the monochromatic sources 1 to 4 advantageously composed of:
  semi-conductor lasers
  light emitting diodes
  GRAAL type monochromatic sources.

For light emitting diodes and lasers, the modulation is obtained by controlling the emission power.

In the case of GRAAL type monochromatic sources, modulation is done by a KERR or POCKEL type electrooptical switch. The modulation frequency may be as high as a gigahertz.

The modulated signals are sent to a multiplexer 9 through optical fibers (11 to 14).

This multiplexer (9) may be made in the form of a multi-forked fiber, in which several strands join together and are merged. However, this solution fixes the number of data paths.

Figure 2:
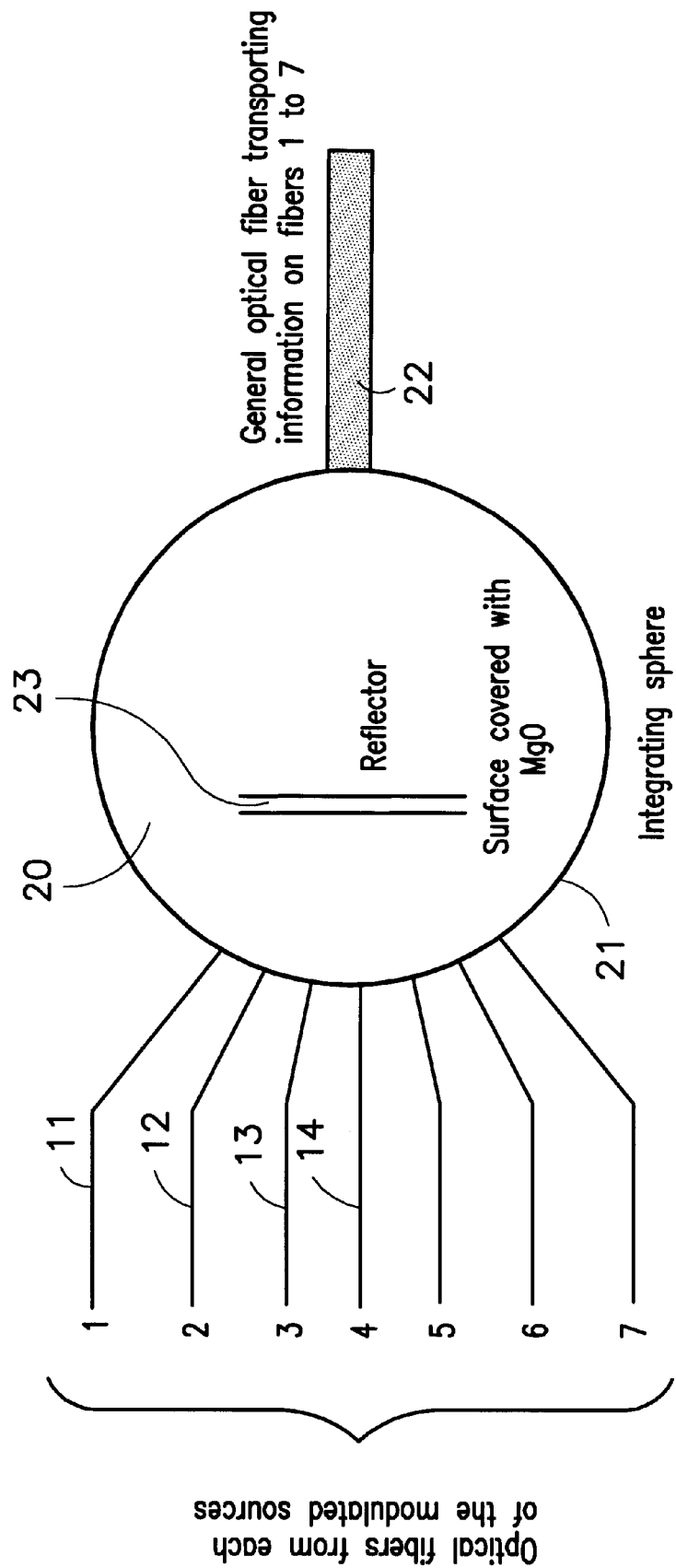
FIG. 2 shows a sectional view of an integrating sphere.

Another preferred solution consists of multiplexing using an integrating sphere, shown in FIG. 2 as a sectional view. It is formed by a thin spherical enclosure (20), the inside surface of which is coated with a reflecting layer 21 made of magnesium oxide MgO deposited by vacuum deposition. Its diameter is about 20 mm.

It may also be made in the form of a sphere made of glass with added lead coated with a reflecting deposit. The optical transmission fiber 22 is coupled to the surface of the integrating sphere, along a radial orientation.

The optical emission fibers 11 to 14 are coupled on the opposite surface of the integrating sphere along radial directions.

A reflector 23 is positioned in the integrating sphere, with an orientation perpendicular to the axis of the optical transmission fiber 22

The optical fiber output is connected to a spectral analyzer 24 (see FIG. 1) providing spectral separation. The spectral analyzer may consist of a detracting network or a prism associated with photodetectors, for example, CCD modules.

According to one variant, the output from the spectral analyzer 24 is coupled to optical fibers 25 to 28 connected to demodulators 31 to 34 equipped with photodetectors.

Figure 3:
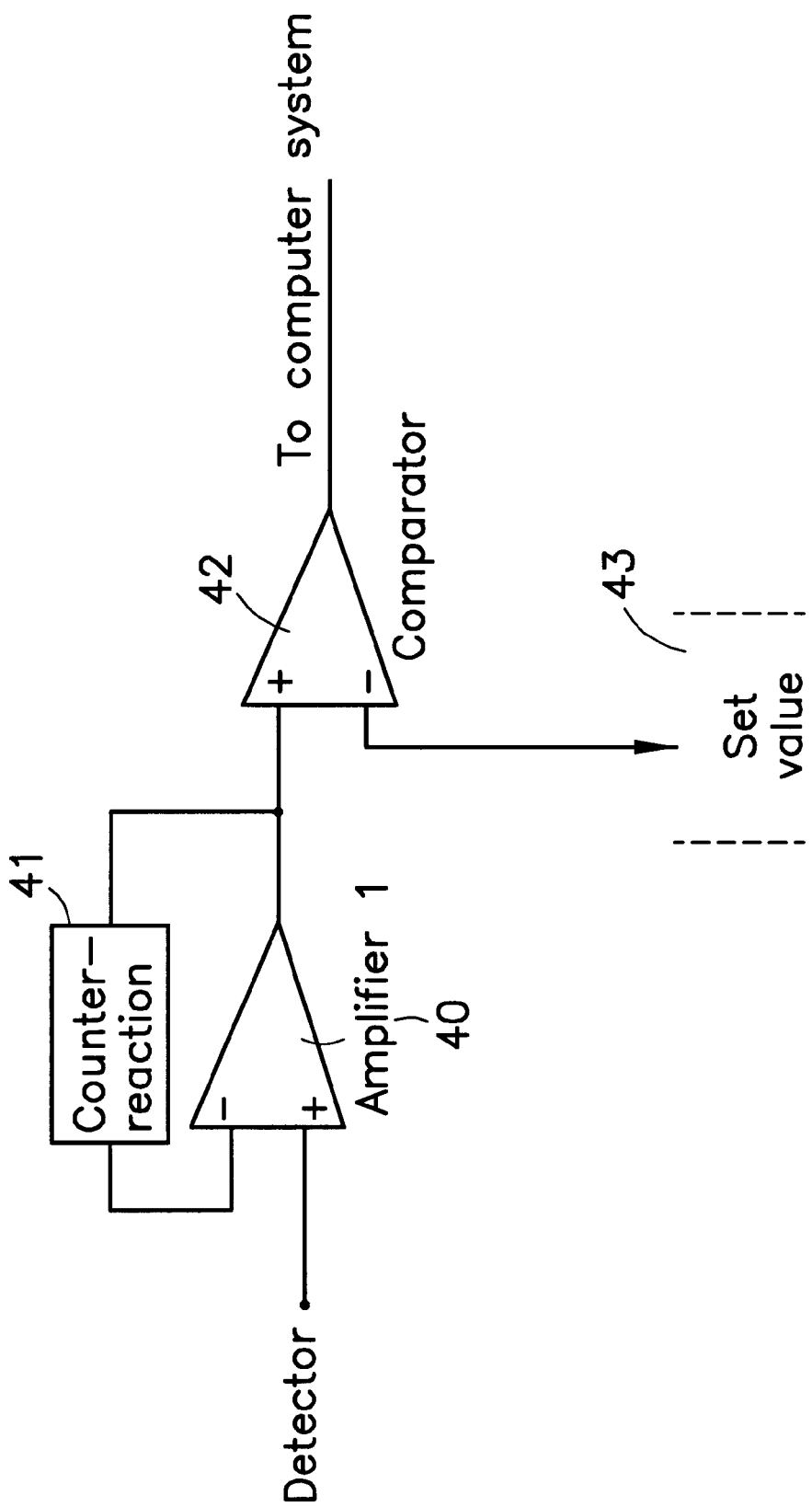
FIG. 3 shows a diagram of the electrical signal processing circuit.

FIG. 3 shows a diagram of the electrical signal processing paths.

The detector output is connected to the positive input of an operational amplifier 40 of which the negative input is connected in a known manner to a counter-reaction circuit 41. The output from this first operational amplifier 40 is connected to the positive input of a second operational amplifier 42, the negative input of which is connected to a set voltage source 43.

The rest of the description will describe a particular type of light source.

FIGS. 4 and 5 show the spectral response of the filtering coating forming part of the transparent matrix, and the spectral behavior of the doping agent, on the same graph.

The upper curve 51 shows the transmission and reflection factor of the coating placed on the entry surface of the device, as a function of the wave length of the incident beam.

In the example described, the filtering coating has a transmission factor close to 100% for wave lengths less than $\lambda_c$ nanometers. For wave lengths greater than $\lambda_c$ nanometers, the reflection factor is close to 100% and therefore the transmission factor is close to 0. The cutoff slope is more or less steep depending on the filter quality.

Curve 52 represents the spectral behavior of the doping agents included in the transparent matrix.

These doping agents have an excitation spectrum in the wave length band $\lambda_a \pm \Delta\lambda_a$ and a reemission spectrum in the wave length band $\lambda_e \pm \Delta\lambda_e$.

For example, doping agents consist of photoluminescent products, particularly luminescent crystalline or organic materials.

FIG. 6 shows a diagram of operating principles of a device according to the invention.

In the example described, the incident radiation comprises two rays $\lambda_1$ and $\lambda_2$, $\lambda_1$ being shorter than the cutoff wave length $\lambda_c$ of the device filtering coating and approximately equal to $\lambda_a$, the excitation wave length of the doping agent. $\lambda_2$ is greater than this cutoff wave length $\lambda_c$, and is approximately equal to $\lambda_e$, the reemission wave length of the doping agents.

The $\lambda_2$ component is fully reflected by the filter layer 53 and, consequently, only the $\lambda_1$ component enters the doped matrix 54. This incident beam interacts with the doping agents 55 included in the matrix, and is consequently converted into a diffuse beam with wave length $\lambda_e$.

Therefore, a diffuse radiation with wave length $\lambda_e$ will be observed at the exit from the device.

If the incident beam penetrates into the device through an uncoated surface of the filtering layer 53, the ray with wave length $\lambda_e$ cannot exit on the side of the filter coating, since it is reflected by the coating 53. The ray with wave length $\lambda_a$ is absorbed by the doping agents and converted into radiation with wave length $\lambda_e$ which is consequently also reflected by the filter layer 53.

Consequently, the device does not allow the beam entering into the device to pass through an uncoated surface of the filter layer.

FIG. 7 shows a sectional view of the device according to a parabolic type embodiment.

The tubular part of the enclosure of the doped matrix 54 is coated with a layer with selective reflection 53 (see FIG. 6). The parabolic dome 58 is covered with a fully reflecting layer 59. The flat end 60 of the doped matrix 54 is also coated with a completely reflecting layer 62, except for a transparent area 61.

As an example, the doped matrix is a polymethyl methacrylate doped with the following compounds:

PPO 0.5 moles per liter

OB 0.1 moles per liter

GE 0.04 moles per liter

PPO, OB and GE are the usual trade mark names of aromatic cycling molecules. The cutoff wave length $\lambda_c$ of the selective reflection layer is 400 nanometers.

Figure 8:
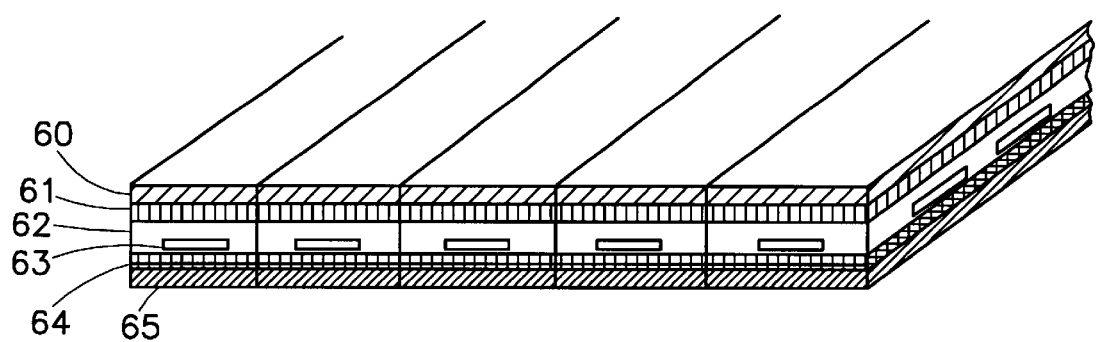
FIG. 8 shows a sectional view of another embodiment.

FIG. 8 shows an example embodiment in which the matrix 63 is transparent and in which the doping agents are deposited on the outside surface of the matrix 63. Doping agents form an enclosure 64 with the reflective layer surrounding the matrix 63, except for an exit window 66 and the surface covered by the dichroic filter 65.

The device according to this embodiment has a high photonic efficiency and includes a light energy concentrator. The window 66 may be equipped with a closing device or an optical chopper. Wave length transfer phenomena occur on the matrix surfaces in this embodiment.

According to another embodiment, the device consists of an association in series of several cells consisting of a doped matrix coated with a dichroic filter. The first cell 67 comprises a matrix doped with doping agents absorbing light energy within a wave length band $\lambda_{a1} \pm \Delta\lambda_{a1}$ and reemitting in a wave length band $\lambda_{e1} \pm \Delta\lambda_{e1}$, the excitation band $\lambda_{a1} \pm \Delta\lambda_{a1}$ being included within the transmission range of the dichroic coating and the reemission band $\lambda_{e1} \pm \Delta\lambda_{e1}$ being included in the reflection range of said coating. The second cell 68 comprises a doped matrix with doping agents absorbing light energy in a wave length band $\lambda_{a2} \pm \Delta\lambda_{a2}$ that corresponds to $\lambda_{e1} \pm \Delta\lambda_{e1}$ and reemitting in a wave length band $\lambda_{e2} \pm \Delta\lambda_{e2}$, the excitation band $\lambda_{a2} \pm \Delta\lambda_{a2}$ being included within the transmission range of the dichroic coating and the reemission band $\lambda_{e2} \pm \Delta\lambda e_2$ being included in the reflection range of said coating.

Similarly, the third cell 69 comprises a matrix doped with doping agents absorbing light energy within a wave length band $\lambda_{a3} \pm \Delta\lambda_{a3}$ that corresponds to $\lambda_{e2} \pm \Delta\lambda_{e2}$ and reemitting in a wave length band $\lambda_{e3} \pm \Delta\lambda_{e3}$, the excitation band $\lambda_{a3} \pm \Delta\lambda_{a3}$ being included within the transmission range of the dichroic coating and the retransmission band $\lambda_{e3} \pm \Delta\lambda_{e3}$ being included in the reflection range of said coating.

The following gives some example combinations of doping agents (the names of products are normal trade names):

In the blue wave lengths range

Short term remanent . . . DMABN $1^{st}$ blue fluorescent . . . OB $2^{nd}$ blue fluorescent . . . PPO $3^{rd}$ blue fluorescent . . . 2205

In the blue-green wave lengths range

Short term remanent . . . DMABN

Green fluorescent . . . 52012 or

Short term green remanent . . . 2330

Green fluorescent (inorganic doping agent) 52012

Short term green remanent . . . 2330

Green fluorescent . . . 52012

In the red wave lengths range

Short term remanent . . . 2305

$1^{st}$ red fluorescent . . . P22

$2^{nd}$ yellow fluorescent . . . 6G $3^{rd}$ orange fluorescent . . . 8G

Obviously, this invention is not restricted to the above, but could be used for any applications and variants with which those skilled in the art will be familiar.

What is claimed is:

1. A process for setting up several data paths on a single optical transmission fiber comprising:

modulating a light source with a specific wave length by signals corresponding to said data path;

transmitting the modulated light signals to a multiplexer;

multiplexing the signals with an integrating sphere having its interior coated with a reflecting surface and having a plane reflector oriented perpendicular to the axis of the transmission optical fiber; and chromatically separating the light signal transmitted by the optical fiber.

2. The process according to claim 1, wherein the monochromatic light sources emit in wave lengths separated by at least 100 nm.

3. The process according to claim 1, wherein the modulated signals are transmitted to the integrating sphere by optical connecting fibers coupled radially to the surface of the integrating sphere.

4. The process according to claim 1, further comprising demultiplexing is performed by a spectral analyzer.

5. The process according to claim 1, wherein the light signals are modulated by KERR electro-optical switches or POCKEL electro-optical switches.

6. A device for setting up several data paths on a single optical transmission fiber comprising:

a plurality of input optical fibers;

a transmission optical fiber;

an integrating sphere with an internal reflecting surface connected between the input optical fibers and the transmission optical fiber; and a plane reflector oriented perpendicularly to the axis of the transmission optical fiber within the integrating sphere.

7. The device according to claim 6, wherein the reflecting surface is formed of MgO.

8. The device according to claim 6, further comprising an emission source comprising an almost transparent matrix and a coating on part of external surfaces of said matrix with a high reflection factor in a first wave length band and a high transmission factor in a second wave length band, the matrix comprising 1) at least one optically active doping agent absorbing electromagnetic energy in one or several wave length bands, and reemitting the energy in one or several wave lengths, at least one of the reemission wave lengths being different from the excitation wave lengths, and 2) a filter coating with maximum retransmission in one or several absorption wave length bands of the doped matrix, and with maximum reflection in at least one of the reemission wave length bands of the doped matrix.

9. The device according to claim 8, wherein the transparent matrix comprises optically active doping agents absorbing light energy in a wave length band $\lambda_a \pm \Delta\lambda_a$ and reemitting in a wave length band $\lambda_e \pm \Delta\lambda_e$, the excitation band $\lambda_a \pm \Delta\lambda_a$ being included in the transmission range of the coating and the reemission band $\lambda_e \pm \Delta\lambda_e$ being included in the relfection range of said coating.

10. The device according to claim 9, wherein the doped matrix is coated with a pass band filter with a cutoff wave length of between $\lambda_a$ and $\lambda_e$.

11. The device according to claim 10, wherein the doped matrix is coated with a pass band filter formed by a dichroic filter.

12. The device according to claim 10, wherein the doped matrix is coated with a pass band filter consisting of an interference filter.

13. The device according to claim 8, wherein the doped matrix also has part of its external surfaces coated with a material reflecting in the reemission wave length band and in the excitation wave length band of the doping agent, and a transparent area.

14. The device according to claim 8, wherein the doped matrix is in the shape of a parallelepiped, the coating having a high reflection factor in a first wave length band and a high transmission factor in a second wave length band being provided on the input surface of said device.

15. The device according to claim 8, wherein the shape of the doped matrix is a parabola, the coating having a high reflection factor in a first wave length band and a high transmission factor in a second wave length band being provided on the side surfaces.

16. The device according to claim 8, wherein the at least one optically active doping agent is deposited on the surface of a transparent matrix.

17. The device according to claim 8, wherein the matrix is composed of several cells each formed by a matrix with a dichroic filter on its input surface, the cell with index n comprises a matrix doped with doping agents absorbing light energy in a wave length band $\lambda_{an} \pm \Delta\lambda_{an}$ approximately equal $\lambda_e(n-1) \pm \Delta\lambda_e(n-1)$ and reemitting in a wave length band $\lambda_{en} \pm \Delta\lambda_{en}$, the excitation band $\lambda_{en} \pm \Delta\lambda_{an}$ being within the transmission range of the dichroic coating and the reemission band $\lambda_{en} \pm \Delta\lambda_{en}$ being within the reflection range of said coating.

* * * * *